US012695585B2

(12) United States Patent
Polaganga

(10) Patent No.: US 12,695,585 B2
(45) Date of Patent: Jul. 28, 2026

(54) PRIORITIZATION OF PAIRED VERSUS UN-PAIRED SPECTRUM SELECTION IN CARRIER AGGREGATION SCENARIOS

(71) Applicant: T-MOBILE INNOVATIONS LLC, Overland Park, KS (US)

(72) Inventor: Roopesh Kumar Polaganga, Bothell, WA (US)

(73) Assignee: T-Mobile Innovations LLC, Overland Park, KS (US)

( * ) Notice: Subject to any disclaimer, the term of this patent is extended or adjusted under 35 U.S.C. 154(b) by 335 days.

(21) Appl. No.: 18/124,416

(22) Filed: Mar. 21, 2023

(65) Prior Publication Data

US 2024/0322988 A1     Sep. 26, 2024

(51) Int. Cl.
| | |
|---|---|
| *H04L 5/00* | (2006.01) |
| *H04L 5/14* | (2006.01) |
| *H04W 72/0453* | (2023.01) |
| *H04W 72/51* | (2023.01) |
| *H04W 72/563* | (2023.01) |

(52) U.S. Cl.
CPC ....... *H04L 5/0098* (2013.01); *H04W 72/0453* (2013.01); *H04W 72/51* (2023.01); *H04W 72/563* (2023.01); *H04L 5/0005* (2013.01); *H04L 5/14* (2013.01)

(58) Field of Classification Search
None
See application file for complete search history.

(56) References Cited

U.S. PATENT DOCUMENTS

| | | | | |
|---|---|---|---|---|
| 11,026,212 | B1 * | 6/2021 | Pawar ................... | H04W 72/21 |
| 2024/0357681 | A1 * | 10/2024 | Rastegardoost ........ | H04W 8/22 |
| 2024/0389129 | A1 * | 11/2024 | Rastegardoost .. | H04W 72/0453 |

* cited by examiner

*Primary Examiner* — Nishant Divecha
(74) *Attorney, Agent, or Firm* — Shook, Hardy & Bacon L.L.P.

(57) ABSTRACT

According to aspects herein, methods and systems for prioritizing paired versus un-paired spectrum selection in carrier aggregation scenarios are provided. More particularly, after determining a node comprises at least one time division duplex (TDD) layer and a frequency division duplex (FDD) layer, a FDD bandwidth is compared to a TDD effective bandwidth. The TDD effective bandwidth considers the slot pattern on the TDD layer. Based on the comparison and capabilities of user equipment (UE), a TDD layer or the FDD layer is selected for carrier aggregation. In this way, priority can be given to the TDD layer or the FDD layer to provide the highest effective bandwidth or to accommodate various load balancing scenarios.

20 Claims, 4 Drawing Sheets

300

302 — DETERMINE A NODE COMPRISES AT LEAST ONE TDD LAYER AND A FDD LAYER

304 — COMPARE A FDD BANDWIDTH TO A TDD EFFECTIVE BANDWIDTH

306 — BASED ON THE COMPARISON AND CAPABILITIES OF A UE, SELECT A TDD LAYER OF THE AT LEAST ONE TDD LAYER OR THE FDD LAYER FOR CARRIER AGGREGATION

PRIORITIZATION OF PAIRED VERSUS UN-PAIRED SPECTRUM SELECTION IN CARRIER AGGREGATION SCENARIOS

SUMMARY

Embodiments of the technology described herein are directed to, among other things, systems and methods for prioritizing paired versus un-paired spectrum selection in carrier aggregation scenarios are provided. More particularly, after determining a node comprises at least one time division duplex (TDD) layer and a frequency division duplex (FDD) layer, a FDD bandwidth is compared to a TDD effective bandwidth. The TDD effective bandwidth considers the slot pattern on the TDD layer. Based on the comparison and capabilities of user equipment (UE), a TDD layer or the FDD layer is selected for carrier aggregation. In this way, priority can be given to the TDD layer or the FDD layer to provide the highest effective bandwidth or to accommodate various load balancing scenarios.

This summary is provided to introduce a selection of concepts in a simplified form that are further described below in the detailed description. This summary is not intended to identify key features or essential features of the claimed subject matter, nor is it intended to be used in isolation as an aid in determining the scope of the claimed subject matter.

BRIEF DESCRIPTION OF THE DRAWINGS

Implementations of the present disclosure are described in detail below with reference to the attached drawing figures, wherein.

DETAILED DESCRIPTION

Figure 1:
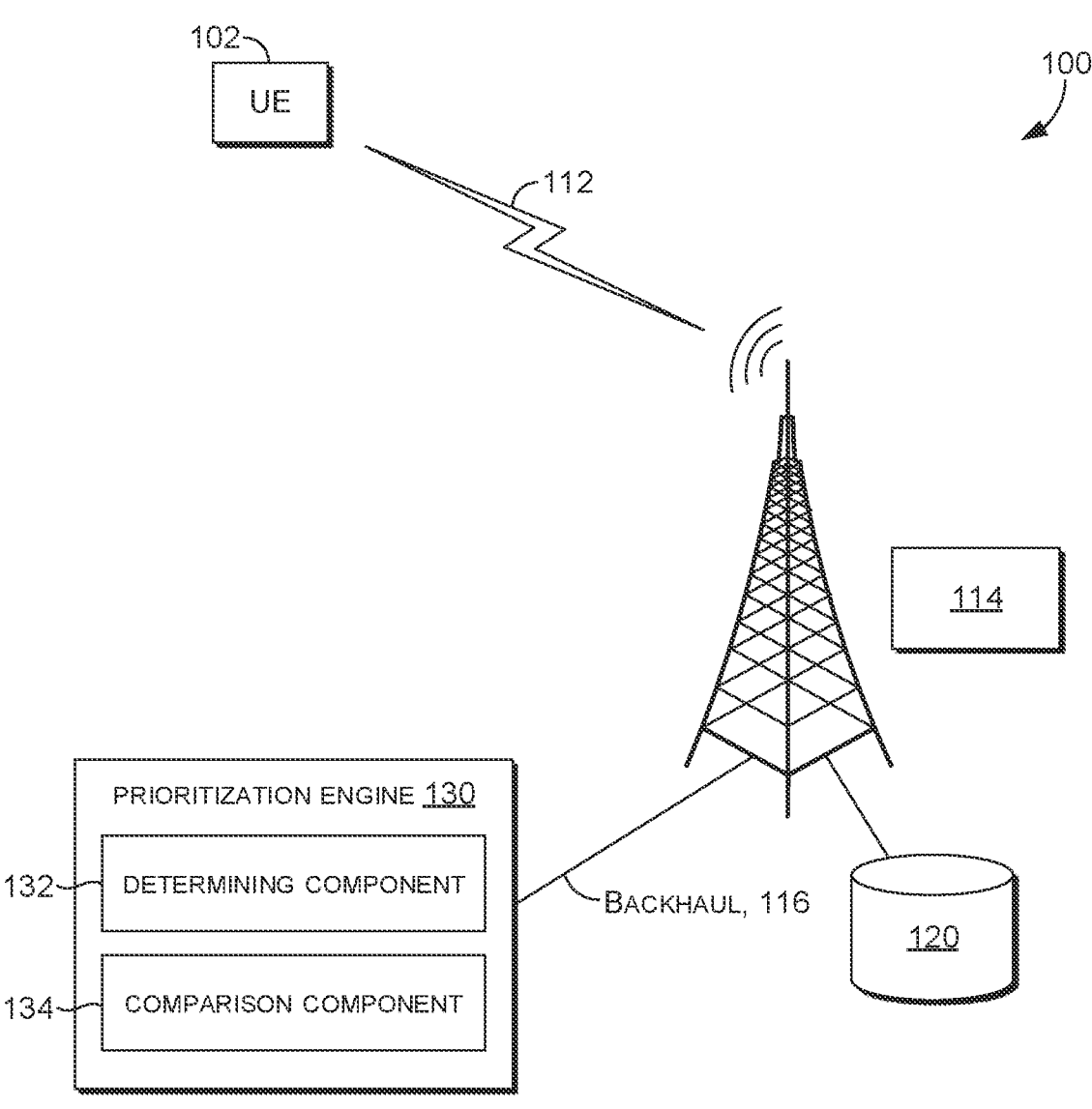
FIG. 1 illustrates a diagram of an exemplary network environment in which implementations of the present disclosure may be employed.

The subject matter of embodiments of the invention is described with specificity herein to meet statutory requirements. However, the description itself is not intended to limit the scope of this patent. Rather, it is contemplated that the claimed subject matter might be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Throughout this disclosure, several acronyms and shorthand notations are employed to aid the understanding of certain concepts pertaining to the associated system and services. These acronyms and shorthand notations are intended to help provide an easy methodology of communicating the ideas expressed herein and are not meant to limit the scope of embodiments described in the present disclosure. The following is a list of these acronyms:

| | |
|---|---|
| 3G | Third-Generation Wireless Technology |
| 4G | Fourth-Generation Cellular Communication System |
| 5G | Fifth-Generation Cellular Communication System |
| BRS | Broadband Radio Service |
| CD-ROM | Compact Disk Read Only Memory |
| CDMA | Code Division Multiple Access |
| EIRP | Equivalent Isotropically Radiated Power |
| eNodeB | Evolved Node B |
| GIS | Geographic/Geographical/Geospatial Information System |
| gNodeB | Next Generation Node B |
| GPRS | General Packet Radio Service |
| GSM | Global System for Mobile communications |
| iDEN | Integrated Digital Enhanced Network |
| DVD | Digital Versatile Discs |
| EEPROM | Electrically Erasable Programmable Read Only Memory |
| LED | Light Emitting Diode |
| LTE | Long Term Evolution |
| MD | Mobile Device |
| MIMO | Multiple-Input Multiple-Output |
| mMIMO | Massive Multiple-Input Multiple-Output |
| MMU | Massive Multiple-Input Multiple-Output Unit |
| NEXRAD | Next-Generation Radar |
| NR | New Radio |
| NSA | Nonstandalone |
| OOBE | Out-of-Band-Emission |
| PC | Personal Computer |
| PCS | Personal Communications Service |
| PDA | Personal Digital Assistant |
| RAM | Random Access Memory |
| RAT | Radio Access Technology |
| RET | Remote Electrical Tilt |
| RF | Radio-Frequency |
| RFI | Radio-Frequency Interference |
| R/N | Relay Node |
| RNR | Reverse Noise Rise |
| ROM | Read Only Memory |
| RRU | Remote Radio Unit |
| RSRP | Reference Transmission Receive Power |
| RSRQ | Reference Transmission Receive Quality |
| RSSI | Received Transmission Strength Indicator |
| SA | Standalone |
| SINR | Single-to-Interference-Plus-Noise Ratio |
| SNR | Transmission-to-noise ratio |
| SON | Self-Organizing Networks |
| TDMA | Time Division Multiple Access |
| TXRU | Transceiver (or Transceiver Unit) |
| UE | User Equipment |
| UMTS | Universal Mobile Telecommunications Systems |
| WCD | Wireless Communication Device (interchangeable with UE) |

Further, various technical terms are used throughout this description. A definition of such terms can be found in, for example, Newton's Telecom Dictionary by H. Newton, 31st Edition (2018). These definitions are intended to provide a clearer understanding of the ideas disclosed herein but are not intended to limit the scope of the present invention. The definitions and terms should be interpreted broadly and liberally to the extent allowed by the meaning of the words offered in the above-cited reference.

Embodiments of the technology may take the form of, among other things: a method, system, or set of instructions embodied on one or more computer-readable media. Computer-readable media include both volatile and nonvolatile media, removable and nonremovable media, and contemplate media readable by a database, a switch, and various other network devices. By way of example, and not limitation, computer-readable media comprise media implemented in any method or technology for storing information. Examples of stored information include computer-useable instructions, data structures, program modules, and other data representations. Media examples include but are not limited to information-delivery media.

RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These technologies can store data momentarily, temporarily, or permanently.

By way of background, a traditional telecommunications network employs a plurality of base stations (i.e., access point, node, cell sites, cell towers) to provide network coverage. The base stations are employed to broadcast and transmit transmissions to user devices of the telecommunications network. An access point may be considered to be a portion of a base station that may comprise an antenna, a radio, and/or a controller. In aspects, an access point is defined by its ability to communicate with a user equipment (UE), such as a wireless communication device (WCD), according to a single protocol (e.g., 3G, 4G, LTE, 5G, and the like); however, in other aspects, a single access point may communicate with a UE according to multiple protocols. As used herein, a base station may comprise one access point or more than one access point.

Factors that can affect the telecommunications transmission include, e.g., location and size of the base stations, and frequency of the transmission, among other factors. The base stations are employed to broadcast and transmit transmissions to user devices of the telecommunications network. Traditionally, the base station establishes uplink (or downlink) transmission with a mobile handset over a single frequency that is exclusive to that particular uplink connection (e.g., an LTE connection with an eNodeB or a New Radio (NR) connection). In this regard, typically only one active uplink connection can occur per frequency. The base station may include one or more sectors served by individual transmitting/receiving components associated with the base station (e.g., antenna arrays controlled by an EnodeB). These transmitting/receiving components together form a multi-sector broadcast arc for communication with mobile handsets linked to the base station.

As used herein, UE (also referenced herein as a user device or a wireless communication device) can include any device employed by an end-user to communicate with a wireless telecommunications network. A UE can include a mobile device, a mobile broadband adapter, a fixed location or temporarily fixed location device, or any other communications device employed to communicate with the wireless telecommunications network. For an illustrative example, a UE can include cell phones, smartphones, tablets, laptops, small cell network devices (such as micro cell, pico cell, femto cell, or similar devices), and so forth. Further, a UE can include a sensor or set of sensors coupled with any other communications device employed to communicate with the wireless telecommunications network; such as, but not limited to, a camera, a weather sensor (such as a rain gage, pressure sensor, thermometer, hygrometer, and so on), a motion detector, or any other sensor or combination of sensors. A UE, as one of ordinary skill in the art may appreciate, generally includes one or more antennas coupled to a radio for exchanging (e.g., transmitting and receiving) transmissions with a nearby base station or access point.

Carrier aggregation is a technique that allows an uplink or downlink transmission to occur over more than one frequency. As multiple frequency blocks are assigned to the same UE, the throughput is improved. Put another way, the uplink or downlink bandwidth available to the UE is increased. Carrier aggregation can be accomplished using an additional time division duplex (TDD) layer or a frequency division duplex (FDD) layer.

FDD is typically paired spectrum with sufficient separation between uplink and downlink. FDD systems result in higher peak and average throughput speeds in uplink and downlink than TDD at equal bandwidths. If FDD and TDD both have a capacity of 10 MHz, FDD performs better because have FDD has 10 MHz for both uplink and downlink, while uplink and downlink in TDD has to share 10 MHz in the time domain. In other words, TDD does not require paired spectrum as both uplink and downlink communication happens through the same channel.

TDD systems use time division multiplexing to separate uplink and downlink signals. It emulates full duplex communication over a half-duplex communication link. TDD provides flexibility in situations where there is asymmetry of uplink and downlink data rates. As the amount of uplink data increases, more communication capacity can be allocated by the network operator, and when the traffic load is lighter, capacity can be decreased by the network operator. Similarly, as the amount of downlink data increases, more communication capacity can be allocated by the network operator, and when the traffic load is lighter, capacity can be decreased by the network operator.

In one conventional carrier aggregation scenario, the combination of carriers or layers depends on carrier bandwidth. For example, assume the node supports two TDD layers and one FDD layer. Further, assume the first TDD layer has a capacity of 90 MHz, the second TDD layer has a capacity of 100 MHz, and the FDD layer has a capacity of 10 MHz. In this scenario, the first TDD layer and the second TDD layer would be selected for carrier aggregation (provided the UE supports each TDD layer at the assumed frequencies) because the TDD layers appear to have higher capacity.

In another conventional carrier aggregation scenario, the combination of carriers or layers depends on load. For example, assume the node again supports two TDD layers and one FDD layer. Further assume the first TDD layer has a capacity of 90 MHz, the second TDD layer has a capacity of 100 MHz, and the FDD layer has a capacity of 10 MHz. However, in this scenario, the first TDD layer is already overloaded with traffic. For this reason, it no longer makes sense to select the first TDD layer and the second TDD layer for carrier aggregation. Rather, the second TDD layer and the FDD layer would be selected for carrier aggregation (again, provided the UE supports the second TDD layer and the FDD layer at the assumed frequencies).

In yet another conventional carrier aggregation scenario, the combination of carriers or layers depends on a weighted factor. For example, assume the node again supports two TDD layers and one FDD layer. Further assume the first TDD layer has a capacity of 90 MHz, the second TDD layer has a capacity of 100 MHz, and the FDD layer is mid-band (e.g., n1900). In this scenario, since all devices may not support mid-band FDD layer, the second TDD layer and the FDD layer may be weighted and selected over the first TDD layer and the second TDD layer even if it provides lower bandwidth (provided the UE supports mid-band FDD). As can be appreciated, without incorporation of the weighted factor, the FDD layer might otherwise never be selected for carrier aggregation since it provides inferior bandwidth. This enables it to be selected and improves load balancing at the node.

However, none of the above carrier aggregation scenarios consider TDD slot format. Put another way, none of the conventional carrier aggregation scenarios consider the TDD effective bandwidth. Rather, conventional carrier aggregation scenarios only consider absolute bandwidth. Accordingly, each of the TDD layers are often selected for carrier aggregation even when the FDD layer provides greater bandwidth for the given scenario.

The present disclosure is directed to systems, methods, and computer readable media for prioritizing paired versus un-paired spectrum selection in carrier aggregation scenarios. More particularly, after determining a node comprises at least one time division duplex (TDD) layer and a frequency division duplex (FDD) layer, a FDD bandwidth is compared to a TDD effective bandwidth. The TDD effective bandwidth considers the slot pattern on the TDD layer. Based on the comparison and capabilities of user equipment (UE), a TDD layer or the FDD layer is selected for carrier aggregation. In this way, priority can be given to the TDD layer or the FDD layer to provide the highest effective bandwidth or to accommodate various load balancing scenarios. Moreover, the end user is provided increased throughput and a better overall experience.

According to aspects of the technology described herein, a method for prioritizing paired versus un-paired spectrum selection in carrier aggregation scenarios is provided. The method comprises determining a node comprises at least one time division duplex (TDD) layer and a frequency division duplex (FDD) layer. The method also comprises comparing a FDD bandwidth to a TDD effective bandwidth. The method further comprises, based on the comparison and capabilities of a user equipment (UE), select a TDD layer of the at least one TDD layer or the FDD layer for carrier aggregation.

According to further aspects of the technology described herein, one or more computer-readable media having computer-executable instructions embodied thereon that, when executed by at least one computing device, cause the computing device to perform operations for prioritizing paired versus un-paired spectrum selection in carrier aggregation scenarios is provided. The operations comprise determining a node comprises at least one time division duplex (TDD) layer and a frequency division duplex (FDD) layer. The operations also comprise comparing a FDD bandwidth to a TDD effective bandwidth. The operations further comprise, based on the comparison and capabilities of a user equipment (UE), selecting a TDD layer of the at least one TDD layer or the FDD layer for carrier aggregation.

According to even further aspects of the technology described herein, a system for prioritizing paired versus un-paired spectrum selection in carrier aggregation scenarios is provided. The system comprises a UE. The system also comprises a node configured to wirelessly communicate with the UE. The node is configured to provide at least one time division duplex (TDD) layer and a frequency division duplex (FDD) layer. The node is also configured to compare a FDD bandwidth to a TDD effective bandwidth. The node is further configured to, based on the comparison and capabilities of a user equipment (UE), select a TDD layer of the at least one TDD layer or the FDD layer for carrier aggregation.

FIG. 1 depicts a wireless network environment incorporating a carrier aggregation system in which implementations of the present disclosure may be employed. Such a network environment is illustrated and designated generally as network environment 100. Network environment 100 is not to be interpreted as having any dependency or requirement relating to any one or combination of components illustrated.

Network environment 100 includes user equipment (UE) 102, access point 114 (which may be a cell site, base station, or the like), and one or more communication channels 112. In network environment 100, user devices may take on a variety of forms, such as a personal computer (PC), a user device, a smart phone, a smart watch, a laptop computer, a mobile phone, a mobile device, a tablet computer, a wearable computer, a personal digital assistant (PDA), a server, a CD player, an MP3 player, a global positioning system (GPS) device, a video player, a handheld communications device, a workstation, a router, a hotspot, and any combination of these delineated devices, or any other device (such as the computing device) that communicates via wireless communications with the access point 114 in order to interact with a public or private network.

Figure 4:
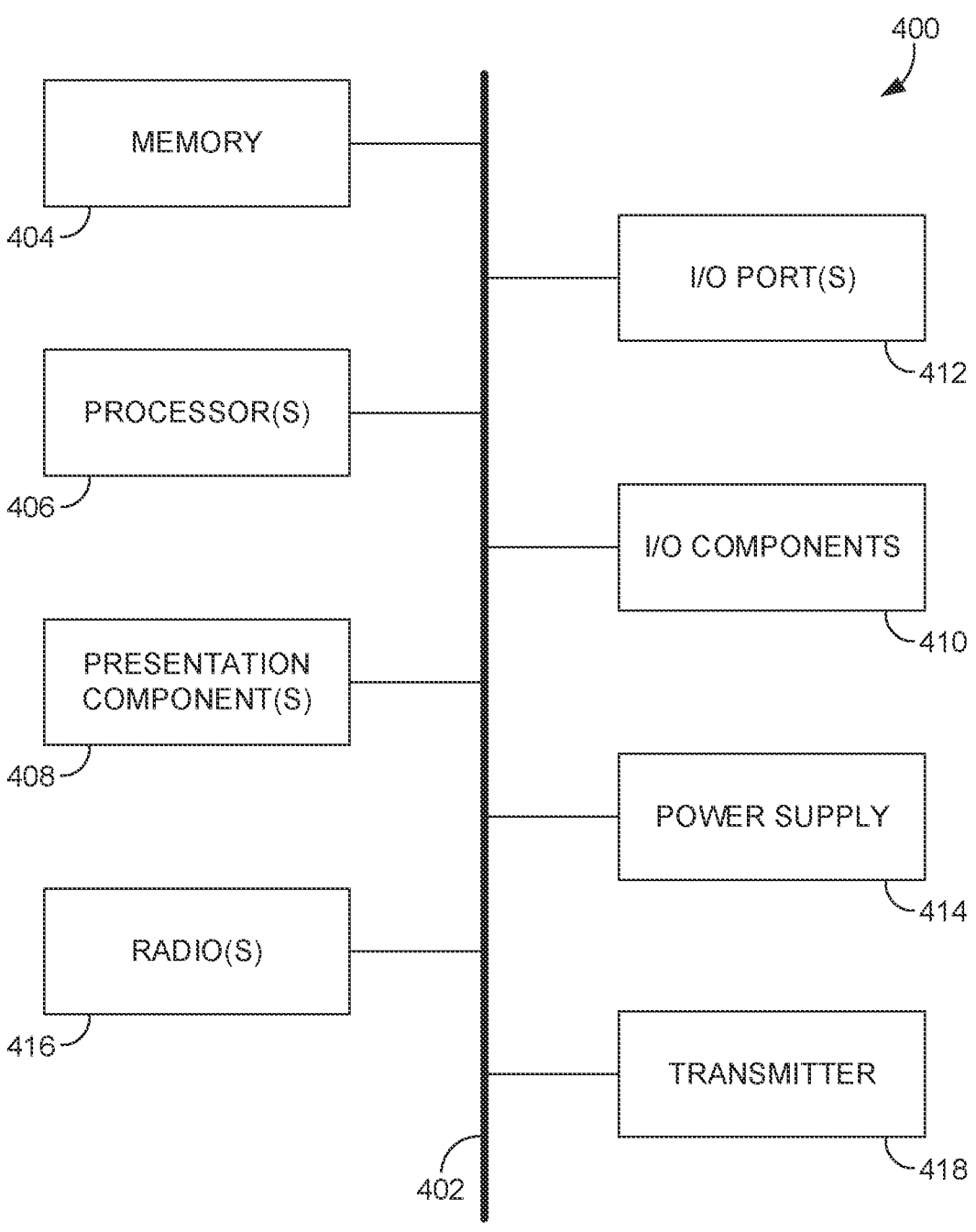
FIG. 4 depicts an example computing environment suitable for use in implementation of the present disclosure.

In some aspects, the UE 102 may correspond to computing device 400 in FIG. 4. Thus, a UE can include, for example, a display(s), a power source(s) (e.g., a battery), a data store(s), a speaker(s), memory, a buffer(s), a radio(s) and the like. In some implementations, for example, a UE 102 comprises a wireless or mobile device with which a wireless telecommunication network(s) can be utilized for communication (e.g., voice and/or data communication). In this regard, the user device can be any mobile computing device that communicates by way of a wireless network, for example, a 3G, 4G, 5G, LTE, CDMA, or any other type of network.

In some cases, UE 102 in network environment 100 can optionally utilize one or more communication channels 112 to communicate with other computing devices (e.g., a mobile device(s), a server(s), a personal computer(s), etc.) through access point 114. The network environment 100 may be comprised of a telecommunications network(s), or a portion thereof. A telecommunications network might include an array of devices or components (e.g., one or more base stations), some of which are not shown. Those devices or components may form network environments similar to what is shown in FIG. 1, and may also perform methods in accordance with the present disclosure. Components such as terminals, links, and nodes (as well as other components) can provide connectivity in various implementations. Network environment 100 can include multiple networks, as well as being a network of networks, but is shown in more simple form so as to not obscure other aspects of the present disclosure.

The one or more communication channels 112 can be part of a telecommunication network that connects subscribers to their immediate telecommunications service provider (i.e., home network carrier). In some instances, the one or more communication channels 112 can be associated with a telecommunications provider that provides services (e.g., 3G network, 4G network, LTE network, 5G network, NR, and the like) to user devices, such as UE 102. For example, the one or more communication channels may provide voice, SMS, and/or data services to UE 102, or corresponding users that are registered or subscribed to utilize the services provided by the telecommunications service provider. The one or more communication channels 112 can comprise, for example, a 1× circuit voice, a 3G network (e.g., CDMA, CDMA2000, WCDMA, GSM, UMTS), a 4G network (WiMAX, LTE, HSDPA), or a 5G network.

In some implementations, access point 114 is configured to communicate with a UE, such as UE 102, that are located within the geographic area, or cell, covered by radio antennas of access point 114. An access point 114 may include one or more base stations, base transmitter stations, radios, antennas, antenna arrays, power amplifiers, transmitters/ receivers, digital signal processors, control electronics, GPS equipment, and the like. In particular, access point 114 may selectively communicate with the user devices using dynamic beamforming.

As shown, access point 114 is in communication with a network component 130 and at least a network database 120 via a backhaul channel 116. As the UE 102 communicates with the access point 114, access point 114 may collect and store the data corresponding to capabilities of the UE 102 at a network database 120. The access point 114 may also collect and store the data corresponding to the current slot ratio. The data may be communicated or retrieved and stored periodically within a predetermined time interval which may be in seconds, minutes, hours, days, months, years, and the like. With the incoming of new data, the network database 120 may be refreshed with the new data every time, or within a predetermined time threshold so as to keep the data stored in the network database 120 current. The data can include, for example, uplink and downlink usage, geographic location, time of day, available networks, and the like.

The prioritization engine 130 generally prioritizes paired versus un-paired spectrum selection in carrier aggregation scenarios, in accordance with aspects herein. The prioritization engine comprises a determining component 132 and a comparison component 134. Although the prioritization engine 130 is shown as a single component comprising the determining component 132 and the comparison component 134, it is also contemplated that each of the determining component 132 and the comparison component 134 may reside at different locations, be its own separate entity, and the like, within the home network carrier system, or as a component of one of UE 102.

The determining component 132 generally determines a node comprises at least one time division duplex (TDD) layer and a frequency division duplex (FDD) layer. The determining component 132 may also determine the capabilities of the UE 102 based on communications with the UE 102. The determining component 132 further determines a downlink slot format or an uplink slot format of the at least one TDD layer. In some aspects, the determining component 132 determines configuration of the access point 114 (e.g., downlink standalone new radio carrier aggregation, downlink E-UTRAN New Radio—Dual Connectivity (ENDC), uplink standalone new radio carrier aggregation, or uplink ENDC).

The comparison component 134 generally compares a FDD bandwidth to a TDD effective bandwidth. Based on the comparison and capabilities of the UE 102, the comparison component 134 selects the TDD layer of the at least one TDD layer or the FDD layer for carrier aggregation. For example, the TDD layer of the at least one TDD layer is selected if the TDD effective bandwidth is greater than the FDD bandwidth and the capabilities of the UE support the TDD layer. In contrast, the FDD layer is selected if the FDD bandwidth is greater than the TDD effective bandwidth and the capabilities of the UE support the FDD layer.

Figure 2:
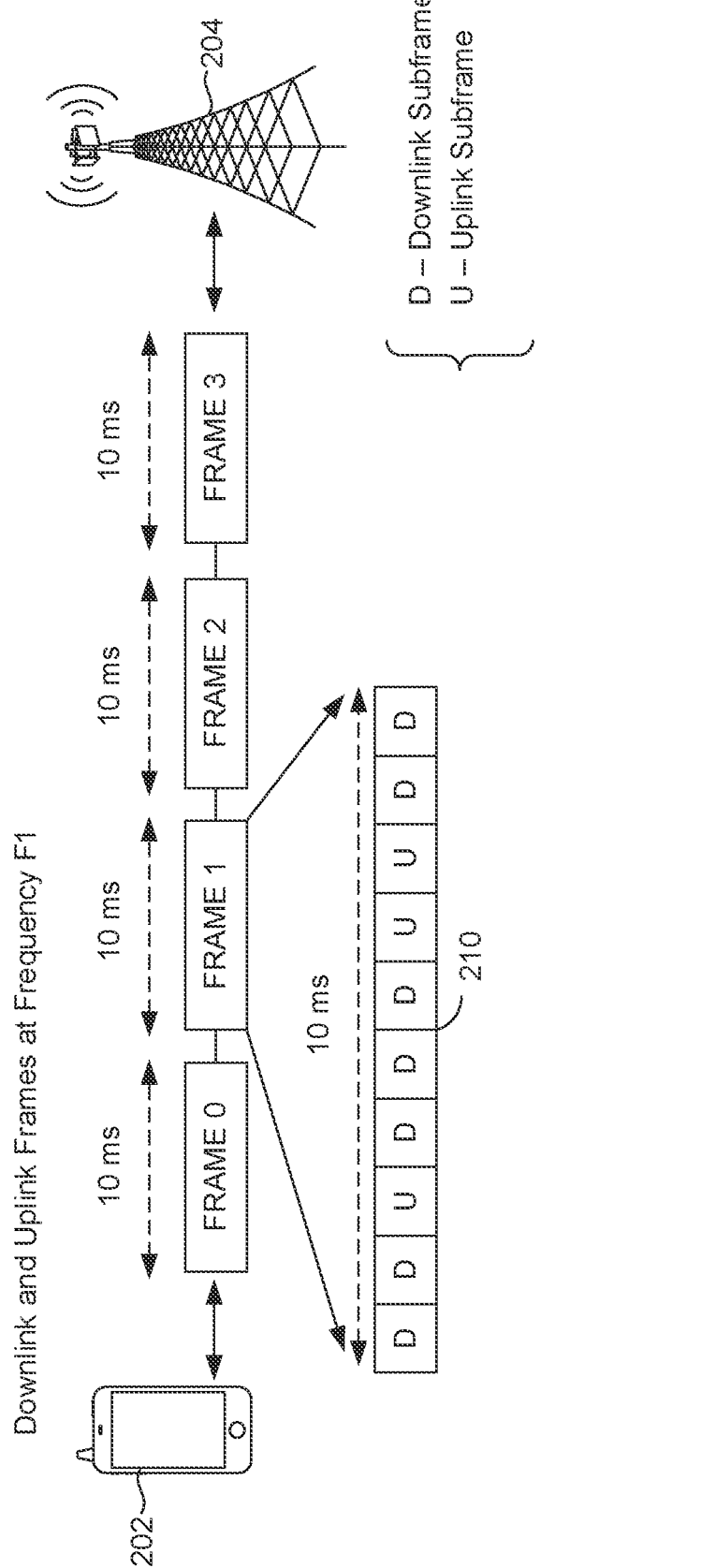
FIG. 2 depicts a wireless network environment incorporating a carrier aggregation system prioritizes paired versus un-paired spectrum selection in carrier aggregation scenarios, in accordance with aspects herein.

FIG. 2 depicts a wireless network environment 200 incorporating a system for prioritizing paired versus un-paired spectrum selection in carrier aggregation scenarios, in accordance with aspects herein. The wireless network environment 200 includes UE 202 and node 204 comprising at least one TDD layer and a FDD layer. In this scenario, prioritization engine (such as the prioritization engine 130 of FIG. 1) prioritizes paired versus un-paired spectrum selection in carrier aggregation scenarios. As illustrated, the downlink/ uplink ratio for the current frame is 70:30 (or, conversely, the uplink/downlink ratio is 30:70).

Figure 3:
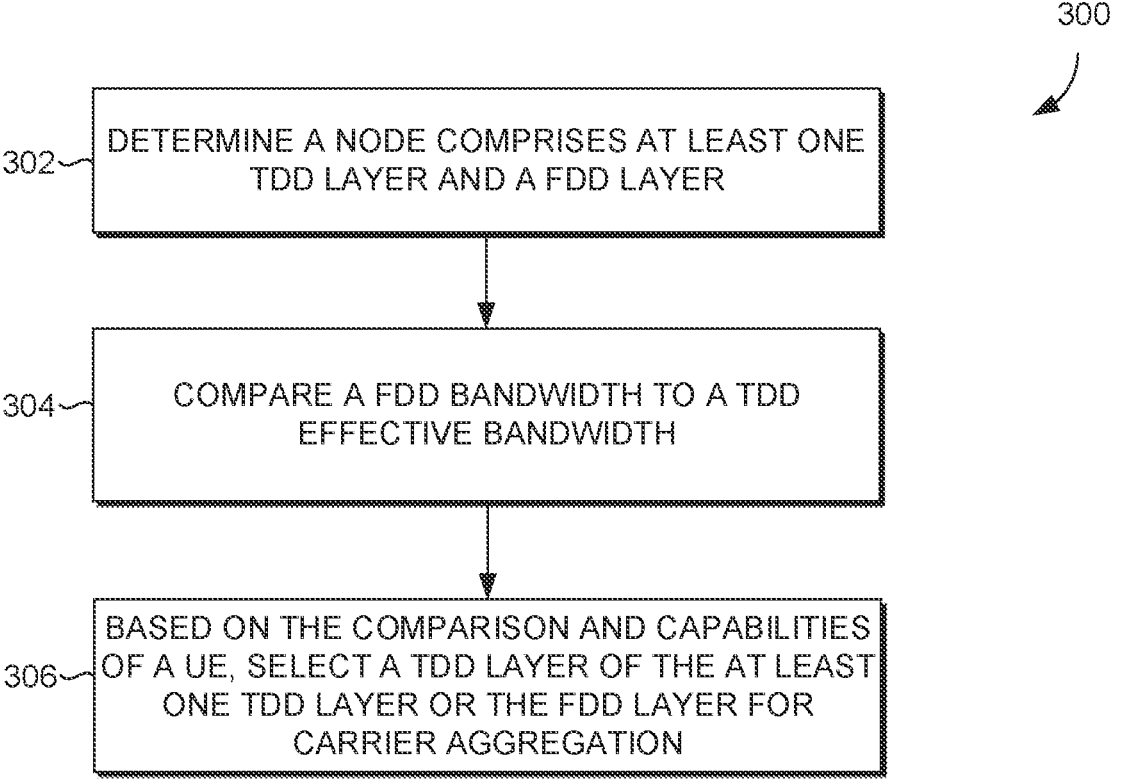
FIG. 3 is a flow diagram of an example method for prioritizing paired versus un-paired spectrum selection in carrier aggregation scenarios, in accordance with some aspects of the technology described herein.

In a downlink carrier aggregation scenario, the TDD effective bandwidth is determined by multiplying the downlink/uplink ratio by the frequency. For example, if the frequency is 100 MHz, the TDD effective bandwidth is 0.7 multiplied by 100 MHz or 70 MHz. If the FDD bandwidth is 40 MHz, the TDD layer is selected for carrier aggregation. In an uplink carrier aggregation scenario, the TDD effective bandwidth is determined by multiplying the uplink/downlink ratio by the frequency. For example, if the frequency is 100 MHz, the TDD effective bandwidth is 0.3 multiplied by 100 MHz or 30 MHz. If the FDD bandwidth is 40 MHz, the FDD layer is selected for carrier aggregation Referring to FIG. 3, a flow diagram is provided depicting a method 300 for prioritizing paired versus un-paired spectrum selection in carrier aggregation scenarios, in accordance with aspects of the present invention. Method 300 may be performed by any computing device (such as computing device described with respect to FIG. 4) with access to a prioritization engine (such as the one described with respect to FIG. 1) or by one or more components of the network environment described with respect to FIG. 1 (such as UE 102, access point 114, or prioritization engine 130).

Initially, at step 302, a node is determined to comprise at least one TDD layer and a FDD layer. In some aspects, capabilities of the UE are determined. For example, a particular UE may not support a mid-band (e.g., n1900) frequency, but may support a low-band (e.g., n600) frequencies. In this scenario, the mid-band frequency may be eliminated for carrier aggregation since the UE does not support it. In this regard, only the TDD layers and the low-band FDD layer will be considered for carrier aggregation. In some aspects, the UE may only support a single layer so carrier aggregation may not even be viable for that UE.

At step 304, a FDD bandwidth is compared to a TDD effective bandwidth. To do so, in some aspects, a downlink slot format or an uplink slot format of the at least one TDD layer is determined. The TDD effective bandwidth can be determined by multiplying a TDD original bandwidth by the downlink slot format or the uplink slot format. Based on the comparison and capabilities of a user equipment (UE), at step 306, a TDD layer of the at least one TDD layer or the FDD layer is selected for carrier aggregation.

By way of example, the node may be configured with downlink standalone new radio carrier aggregation or downlink E-UTRAN New Radio—Dual Connectivity. In this scenario, the TDD effective bandwidth of the at least one TDD layer is determined by multiplying a TDD original bandwidth by the downlink slot format. The TDD layer of the at least one TDD layer is selected if the TDD effective bandwidth is greater than the FDD bandwidth and the capabilities of the UE support the TDD layer. In contrast, the FDD layer is selected if the FDD bandwidth is greater than the TDD effective bandwidth and the capabilities of the UE support the FDD layer.

In another example, the node may be configured with uplink standalone new radio carrier aggregation or uplink E-UTRAN New Radio—Dual Connectivity. In this scenario, the TDD effective bandwidth of the at least one TDD layer is determined by multiplying a TDD original bandwidth by the uplink slot format. The TDD layer of the at least one TDD layer is selected if the TDD effective bandwidth is greater than the FDD bandwidth and the UE supports the TDD layer. In contrast, the FDD layer is selected if the FDD bandwidth is greater than the TDD effective bandwidth and the UE supports the FDD layer.

In practice, assume a gNodeB is defined as standalone NR and must select between TDD/TDD versus TDD/FDD for carrier aggregation. Further, assume the gNodeB is configured with downlink standalone NR carrier aggregation with both TDD and FDD layers. The FDD bandwidth is compared with the TDD effective bandwidth (i.e., TDD downlink slot ratio multiplied by TDD original bandwidth). The gNodeB also receives information from the UE and understands what bands the UE supports. The gNodeB selects FDD for downlink standalone carrier aggregation if the FDD bandwidth is greater than the TDD effective bandwidth and the UE supports the FDD band. Conversely, the gNodeB selects TDD for downlink standalone carrier aggregation if the TDD effective bandwidth is greater than the FDD bandwidth.

Next, assume the gNodeB is again defined as standalone NR and must select between TDD/TDD versus TDD/FDD for carrier aggregation. Further, assume the gNodeB is configured with uplink standalone NR carrier aggregation with both TDD and FDD layers. The FDD bandwidth is compared with the TDD effective bandwidth (i.e., TDD uplink slot ratio multiplied by TDD original bandwidth). The gNodeB also receives information from the UE and understands what bands the UE supports. The gNodeB selects FDD for uplink standalone carrier aggregation if the FDD bandwidth is greater than the TDD effective bandwidth and the UE supports the FDD band. Conversely, the gNodeB selects TDD for uplink standalone carrier aggregation if the TDD effective bandwidth is greater than the FDD bandwidth.

Now, assume an eNodeB is defined as standalone NR and must select between LTE/TDD/TDD versus LTE/TDD/FDD versus LTE/FDD versus LTE/TDD for carrier aggregation. Further, assume the eNodeB is configured with downlink E-UTRAN New Radio—Dual Connectivity (ENDC) carrier aggregation with both TDD and FDD layers. The FDD bandwidth is compared with the TDD effective bandwidth (i.e., TDD downlink slot ratio multiplied by TDD original bandwidth). The eNodeB also receives information from the UE and understands what bands the UE supports. The eNodeB selects FDD for downlink ENDC carrier aggregation if the FDD bandwidth is greater than the TDD effective bandwidth and the UE supports the FDD band. Conversely, the eNodeB selects TDD for downlink ENDC carrier aggregation if the TDD effective bandwidth is greater than the FDD bandwidth.

Next, assume the gNodeB is again defined as standalone NR and must select between LTE/TDD/TDD versus LTE/ TDD/FDD versus LTE/FDD versus LTE/TDD for carrier aggregation. Further, assume the eNodeB is configured with uplink ENDC carrier aggregation with both TDD and FDD layers. The FDD bandwidth is compared with the TDD effective bandwidth (i.e., TDD uplink slot ratio multiplied by TDD original bandwidth). The eNodeB also receives information from the UE and understands what bands the UE supports. The eNodeB selects FDD for uplink ENDC carrier aggregation if the FDD bandwidth is greater than the TDD effective bandwidth and the UE supports the FDD band. Conversely, the eNodeB selects TDD for uplink ENDC carrier aggregation if the TDD effective bandwidth is greater than the FDD bandwidth.

FIG. 4 depicts a diagram of an exemplary network environment in which implementations of the present disclosure may be employed. In FIG. 4, computing device 400 includes bus 402 that directly or indirectly couples the following devices: memory 404, one or more processors 406, one or more presentation components 408, input/output (I/O) ports 412, I/O components 410, radio 416, transmitter 418, and power supply 414. Bus 402 represents what may be one or more busses (such as an address bus, data bus, or combination thereof). Although the devices of FIG. 4 are shown with lines for the sake of clarity, in reality, delineating various components is not so clear, and metaphorically, the lines would more accurately be grey and fuzzy. For example, one may consider a presentation component such as a display device to be one of I/O components 410. Also, processors, such as one or more processors 406, have memory. The present disclosure hereof recognizes that such is the nature of the art, and reiterates that FIG. 4 is merely illustrative of an exemplary computing environment that can be used in connection with one or more implementations of the present disclosure. Distinction is not made between such categories as "workstation," "server," "laptop," "handheld device," etc., as all are contemplated within the scope of FIG. 4 and refer to "computer" or "computing device."

Computing device 400 typically includes a variety of computer-readable media. Computer-readable media can be any available media that can be accessed by computing device 400 and includes both volatile and nonvolatile media, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules or other data. Computer storage media includes RAM, ROM, EEPROM, flash memory or other memory technology, CD-ROM, digital versatile disks (DVD) or other optical disk storage, magnetic cassettes, magnetic tape, magnetic disk storage or other magnetic storage devices. Computer storage media does not comprise a propagated data signal.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 404 includes computer-storage media in the form of volatile and/or nonvolatile memory. Memory 404 may be removable, nonremovable, or a combination thereof. Exemplary memory includes solid-state memory, hard drives, optical-disc drives, etc. Computing device 400 includes one or more processors 406 that read data from various entities such as bus 402, memory 404 or I/O components 410. One or more presentation components 408 present data indications to a person or other device. Exemplary one or more presentation components 408 include a display device, speaker, printing component, vibrating component, etc. I/O ports 412 allow computing device 400 to be logically coupled to other devices including I/O components 410, some of which may be built into computing device 400.

Illustrative I/O components 410 include a microphone, joystick, game pad, satellite dish, scanner, printer, wireless device, etc.

The radio 416 represents one or more radios that facilitate communication with a wireless telecommunications network. While a single radio 416 is shown in FIG. 4, it is contemplated that there may be more than one radio 416 coupled to the bus 402. In aspects, the radio 416 utilizes a transmitter 418 to communicate with the wireless telecommunications network. It is expressly conceived that a computing device with more than one radio 416 could facilitate communication with the wireless telecommunications network via both the first transmitter 418 and an additional transmitters (e.g. a second transmitter). Illustrative wireless telecommunications technologies include CDMA, GPRS, TDMA, GSM, and the like. The radio 416 may additionally or alternatively facilitate other types of wireless communications including Wi-Fi, WiMAX, LTE, 3G, 4G, LTE, 5G, NR, VoLTE, or other VoIP communications. As can be appreciated, in various embodiments, radio 416 can be configured to support multiple technologies and/or multiple radios can be utilized to support multiple technologies. A wireless telecommunications network might include an array of devices, which are not shown so as to not obscure more relevant aspects of the invention. Components such as a base station, a communications tower, or even access points (as well as other components) can provide wireless connectivity in some embodiments.

Many different arrangements of the various components depicted, as well as components not shown, are possible without departing from the scope of the claims below. Embodiments of our technology have been described with the intent to be illustrative rather than restrictive. Alternative embodiments will become apparent to readers of this disclosure after and because of reading it. Alternative means of implementing the aforementioned can be completed without departing from the scope of the claims below. Certain features and subcombinations are of utility and may be employed without reference to other features and subcombinations and are contemplated within the scope of the claims.

The invention claimed is:

1. A method for prioritizing paired vs un-paired spectrum selection in carrier aggregation scenarios, the method comprising:

determining a node comprises at least one time division duplex (TDD) layer and at least one frequency division duplex (FDD) layer that are both available for carrier aggregation;

receiving, from a user equipment (UE), capabilities of the UE to support the at least one TDD layer and the at least one FDD layer;

determining, for the at least one TDD layer, a slot format defining proportions of downlink and uplink subframes within a frame;

determining a TDD effective bandwidth by multiplying an original bandwidth of the TDD layer by a ratio derived from the slot format corresponding to either a downlink carrier aggregation configuration or an uplink carrier aggregation configuration;

comparing a FDD bandwidth to a TDD effective bandwidth as part of selecting between a TDD/TDD carrier aggregation composition and a TDD/FDD carrier aggregation composition; and based on the comparison and the capabilities of the UE, selecting the TDD layer or the FDD layer for inclusion in a carrier aggregation set and configuring the node to perform carrier aggregation using the selected layer.

2. The method of claim 1, further comprising determining capabilities of the UE.

3. The method of claim 1, further comprising determining a downlink slot format or an uplink slot format of the at least one TDD layer.

4. The method of claim 3, further comprising determining the node is configured with downlink standalone new radio carrier aggregation or downlink E-UTRAN New Radio—Dual Connectivity.

5. The method of claim 4, further comprising determining the TDD effective bandwidth of the at least one TDD layer by multiplying a TDD original bandwidth by the downlink slot format.

6. The method of claim 5, wherein the TDD layer of the at least one TDD layer is selected if the TDD effective bandwidth is greater than the FDD bandwidth and the capabilities of the UE support the TDD layer.

7. The method of claim 5, wherein the FDD layer is selected if the FDD bandwidth is greater than the TDD effective bandwidth and the capabilities of the UE support the FDD layer.

8. The method of claim 3, further comprising determining the node is configured with uplink standalone new radio carrier aggregation or uplink E-UTRAN New Radio—Dual Connectivity.

9. The method of claim 8, further comprising determining the TDD effective bandwidth of the at least one TDD layer by multiplying a TDD original bandwidth by the uplink slot format.

10. The method of claim 9, wherein the TDD layer of the at least one TDD layer is selected if the TDD effective bandwidth is greater than the FDD bandwidth and the UE supports the TDD layer.

11. The method of claim 9, wherein the FDD layer is selected if the FDD bandwidth is greater than the TDD effective bandwidth and the UE supports the FDD layer.

12. One or more non-transitory computer-readable media having computer-executable instructions embodied thereon that, when executed by at least one computing device, cause the computing device to perform operations for prioritizing paired vs un-paired spectrum selection in carrier aggregation scenarios, the operations comprising:

determining a node comprises at least one time division duplex (TDD) layer and at least one frequency division duplex (FDD) layer for carrier aggregation;

receiving, from a user equipment (UE), capabilities of the UE to support the at least one TDD layer and the at least one FDD layer;

determining, for the TDD layer, a slot format defining downlink and uplink proportions within a frame;

determining a TDD effective bandwidth by multiplying an original bandwidth of the TDD layer by a ratio derived from the slot format corresponding to a selected carrier aggregation direction;

comparing a FDD bandwidth to a TDD effective bandwidth as part of selecting between a TDD/TDD carrier aggregation composition and a TDD/FDD carrier aggregation composition; and based on the comparison and the capabilities of the UE, selecting the TDD layer or the FDD layer for inclusion in a carrier aggregation set and configuring the node to perform carrier aggregation using the selected layer.

13. The one or more computer-readable media of claim 12, further comprising:

determining capabilities of the UE; and determining a downlink slot format or an uplink slot format of the at least one TDD layer.

14. The one or more computer-readable media of claim 13, further comprising:

determining the node is configured with downlink standalone new radio carrier aggregation or downlink E-UTRAN New Radio—Dual Connectivity; and determining the TDD effective bandwidth of the at least one TDD layer by multiplying a TDD original bandwidth by the downlink slot format.

15. The one or more computer-readable media of claim 14, wherein the TDD layer of the at least one TDD layer is selected if the TDD effective bandwidth is greater than the FDD bandwidth and the capabilities of the UE support the TDD layer.

16. The one or more computer-readable media of claim 14, wherein the FDD layer is selected if the FDD bandwidth is greater than the TDD effective bandwidth and the capabilities of the UE support the FDD layer.

17. The one or more computer-readable media of claim 13, further comprising:

determining the node is configured with uplink standalone new radio carrier aggregation or uplink E-UTRAN New Radio—Dual Connectivity; and determining the TDD effective bandwidth of the at least one TDD layer by multiplying a TDD original bandwidth by the uplink slot format.

18. The one or more computer-readable media of claim 17, wherein the TDD layer of the at least one TDD layer is selected if the TDD effective bandwidth is greater than the FDD bandwidth and the UE supports the TDD layer.

19. The one or more computer-readable media of claim 17, wherein the FDD layer is selected if the FDD bandwidth is greater than the TDD effective bandwidth and the UE supports the FDD layer.

20. A system for prioritizing paired vs un-paired spectrum selection in carrier aggregation scenarios, the system comprising:

user equipment (UE); and a node configured to wirelessly communicate with the UE, wherein the node is configured to:

provide at least one time division duplex (TDD) layer and at least one frequency division duplex (FDD) layer for carrier aggregation;

receive, from a user equipment (UE), capabilities of the UE to support the at least one TDD layer and the at least one FDD layer;

determine a slot format of the TDD layer defining downlink and uplink proportions within a frame;

determine a TDD effective bandwidth by multiplying an original bandwidth of the TDD layer by a ratio derived from the slot format corresponding to a selected carrier aggregation direction;

compare a FDD bandwidth to a TDD effective bandwidth for selecting between TDD/TDD and TDD/FDD carrier aggregation compositions; and based on the comparison and the capabilities of the UE, select the TDD layer or the FDD layer for inclusion in a carrier aggregation set and configuring the node to perform carrier aggregation using the selected layer.

* * * * *